United States Patent
Cohen

(10) Patent No.: US 6,317,051 B1
(45) Date of Patent: Nov. 13, 2001

(54) WATER FLOW MONITORING SYSTEM DETERMINING THE PRESENCE OF LEAKS AND STOPPING FLOW IN WATER PIPES

(75) Inventor: Jeffrey David Cohen, Kennett Square, PA (US)

(73) Assignee: Jeffrey D. Cohen, Kennett Square, PA (US)

( * ) Notice: Subject to any disclaimer, the term of this patent is extended or adjusted under 35 U.S.C. 154(b) by 0 days.

(21) Appl. No.: 09/365,511

(22) Filed: Aug. 2, 1999

Related U.S. Application Data

(60) Provisional application No. 60/095,014, filed on Aug. 3, 1998.

(51) Int. Cl.[7] .................................................. G08B 21/00
(52) U.S. Cl. ........................ 340/603; 340/605; 340/606; 340/609
(58) Field of Search ................................ 340/603, 604, 340/605, 606, 609, 611

(56) References Cited

U.S. PATENT DOCUMENTS

| | | | |
|---|---|---|---|
| 4,562,865 | * | 1/1986 | Lemkin et al. ................. 137/624.12 |
| 5,000,224 | * | 3/1991 | Olson, Jr. et al. .............. 137/624.12 |
| 5,004,014 | * | 4/1991 | Bender ............................ 137/624.12 |
| 5,287,884 | * | 2/1994 | Cohen ................................... 137/486 |
| 5,503,175 | * | 4/1996 | Ravilious et al. ........................ 137/1 |
| 5,920,265 | * | 7/1999 | Johnson, Jr. et al. ................ 340/605 |

\* cited by examiner

*Primary Examiner*—Edward Lefkowitz

(57) ABSTRACT

A water flow monitoring system for determining the presence of leaks in plumbing pipes having water flowing through the pipes under high pressure includes a flow monitor which is mounted to the pipe for sensing the flow of water through the pipe. A controller composed of a timer and/or accumulated volume meter associated with the flow monitor, to determine when the flow has continued for a preselected period of time, and/or when the amount of water has exceeded a preselected accumulated volume threshold, and logic components responsive to changes in flow rate. Upon detection of flow for the preselected period of time, and/or preselected accumulated volume threshold, a valve is actuated to stop flow through the pipe.

20 Claims, 4 Drawing Sheets

WATER FLOW MONITORING SYSTEM DETERMINING THE PRESENCE OF LEAKS AND STOPPING FLOW IN WATER PIPES

This application claims the benefit of provisional application No. 60/095,014 filed Aug. 3, 1998.

BACKGROUND OF THE INVENTION

The present invention is directed to preventing unchecked amounts of water from leaking into a home, office, warehouse, building and the like which would otherwise cause damage to the contents of such structure, such as damaging the furniture, clothing, woodwork, artwork and other articles in the structure as well as causing damage to the structure itself. Plumbing systems provide the flow of water under pressure in, for example, a home or other structure. If a leak were to develop in the plumbing system while the building is vacant it is possible that such large amounts of water would be released in an uncontrolled manner that severe damage would be caused. Even if a structure is occupied, where a leak occurs which remains undetected for a period of time, the results could also be disastrous.

SUMMARY OF THE INVENTION

An object of this invention is to provide a water flow monitoring system for determining when a leak occurs and upon the determining of such a leak to take some action to stop further flow through the leaking plumbing.

A further object of this invention is to provide such a system which upon determination of a prolonged water use, operates to warn the user of water, prior to permanently halting the flow of water through the pipe.

A further object of this invention is to provide such a system which upon determination of a leak operates to halt the flow of water through the leaking pipe.

A further object of this invention is to provide such a system which may be temporarily and conveniently disabled or enabled remotely from the location of water use.

A further object of this invention is to provide such a system which distinguishes the difference between prolonged water use and leaking plumbing, and then functions to permit sustained water use or functions to halt water flow respectively.

A still further object of this invention is to provide such a system which distinguishes said difference between prolonged water use and leaking plumbing based on the water usage routine of the water system being controlled.

In accordance with this invention a water flow monitoring system is provided which includes a flow monitoring means mounted to a pipe through which the water flows under high pressure to sense the flow of water through the pipe. Control means having a timer, and/or an accumulated volume meter, is associated with the flow monitor means to determine when the flow has continued for a preselected period of time, and/or continued for a preselected accumulated volume threshold, indicative of unintentional flow or a leak. Said control means contains the capability to recognize and logically respond to information contained in the water flow. Action taking means is also included to respond to the detection of the flow for the preselected period of time, and/or the accumulated volume threshold. In the preferred practice of this invention, the action taking means is a valve mounted in the plumbing system to shut off further flow through the system so that leakage is prevented and the prospective damage to the structure and its contents would be held to a much lower level in comparison to an unmonitored leaking water system.

In a variation of the system a second monitor may be provided near the sewer to sense whether the flow of water has continued through the plumbing system to the sewer. If the flow is sensed at both locations then a leak is assumed not present. If, however, the flow continues in the upstream location, but not near the sewer, this would be indicative of a leak in the system. A provision is included in the control means such that sustained water flow detected in both the source and the downstream sewer lines exceeding a period of time or exceeding an accumulated volume level will cause the control means to determine a leak has occurred and therefore stops the water flow.

THE DRAWINGS

DETAILED DESCRIPTION

Figure 1:
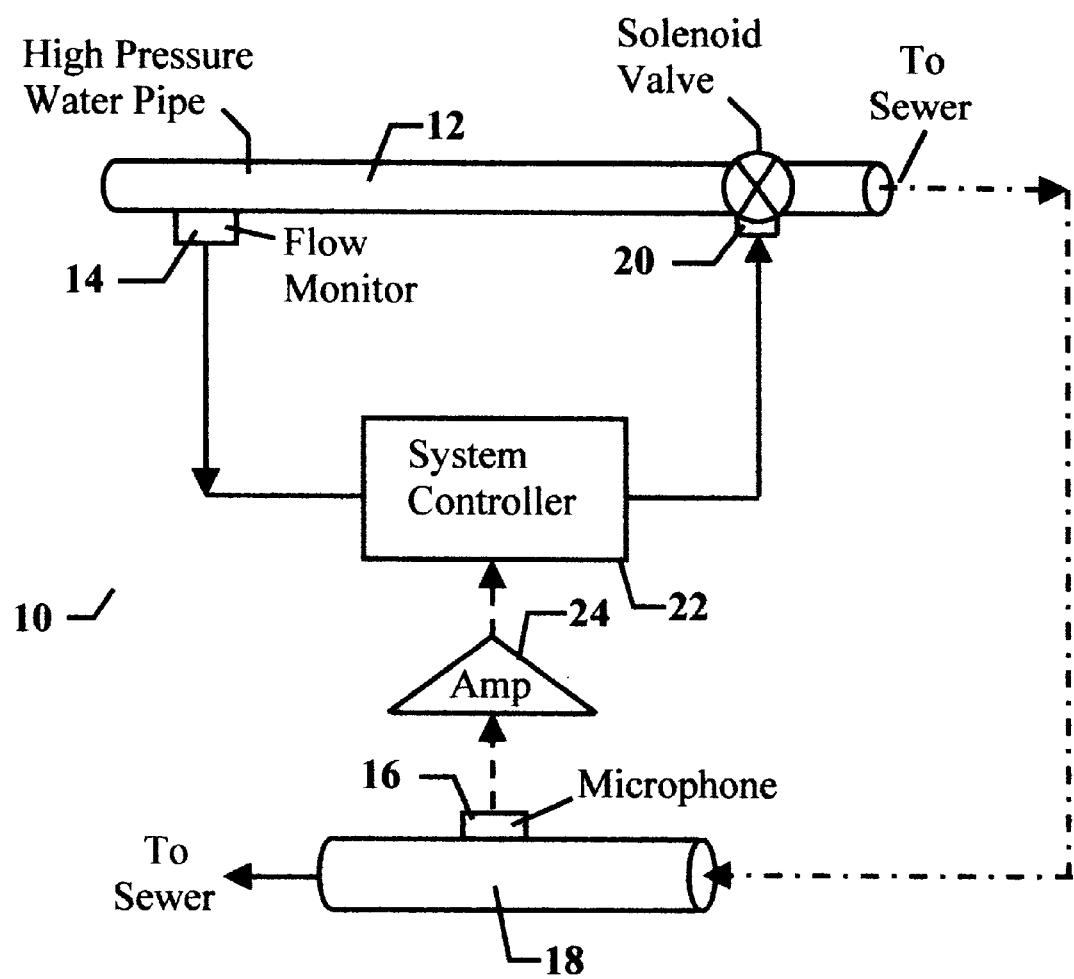
FIG. 1 is a schematic view showing a water flow monitoring system in accordance with this invention.

The present invention is directed to a water flow monitoring system for determining the presence of leaks in plumbing pipes. It is to be understood that although the following description will be with respect to water flowing under high pressure through water pipes through a structure, such as a home or building, the invention may be practiced for determining the presence of leakage of any fluid through pipes in any appropriate environment In general, FIG. 1 illustrates the broad practices of this invention wherein a flow monitoring system 10 is provided which is intended to be used in connection with a high pressure water pipe 12 which eventually leads to a sewer. System 10 uses a flow monitor means 14 which monitors the water flow through the pressurized water pipe 12. As later described if desired as an option a second flow monitor 16 could be mounted downstream through the drain sewer circuit 18. The invention is intended to take some form of action when it is determined that the water flow has continued beyond a predetermined period of time, and/or when water flow has continued beyond a predetermined accumulated volume threshold, which would indicate abnormal water flow or a leak.

As shown in FIG. 1 system 10 includes the flow monitor 14 mounted to pipe 12 preferably at the downstream of the water supply pipe entry into a structure, such as a home. The flow monitor 14 may be of any suitable construction capable of sensing flow and/or monitoring a flow rate. Examples of suitable flow monitors include a microphone in contact with the water pipe, such as microphone 16. Amplifier 24 would be used to amplify the signal from microphone 16 to controller 22. Alternatively, the flow monitor may take other forms which can produce an output signal, related to flow rate, received by controller 22, such as a differential pressure transducer, a rotating paddle wheel, a rotometer, a switch, a mass flow meter, a vortex shedding meter, an ultrasonic transducer or other known suitable flow monitor or detecting means.

Monitor 14 (and monitor 16) indicates or determines the absence or presence of water flow through the portion of the pipe 12 or 18 being monitored. Some form of action taking means, which in the preferred practice of this invention is a mechanized valve 20, is provided in system 10 capable of receiving a signal to close and thereby prevent further flow through pipe 12. The closing of valve 20 would be in response to a signal communicated from the controller, connected in-line with the pressurized water circuit.

In the preferred practice of the invention the valve is an electronically or pneumatically actuated valve. It is to be understood that the invention may be practiced with other types of action taking means such as an audio or visual alarm in addition to or instead of a valve. For example, such alarm might be triggered similar to a burglar alarm at a remote location where the alarm would be sensed and the person sensing the alarm would then know that action must be taken such as going to the dwelling or structure and manually turning off the water in addition to attempting to determine where the leak has occurred.

Figure 2:
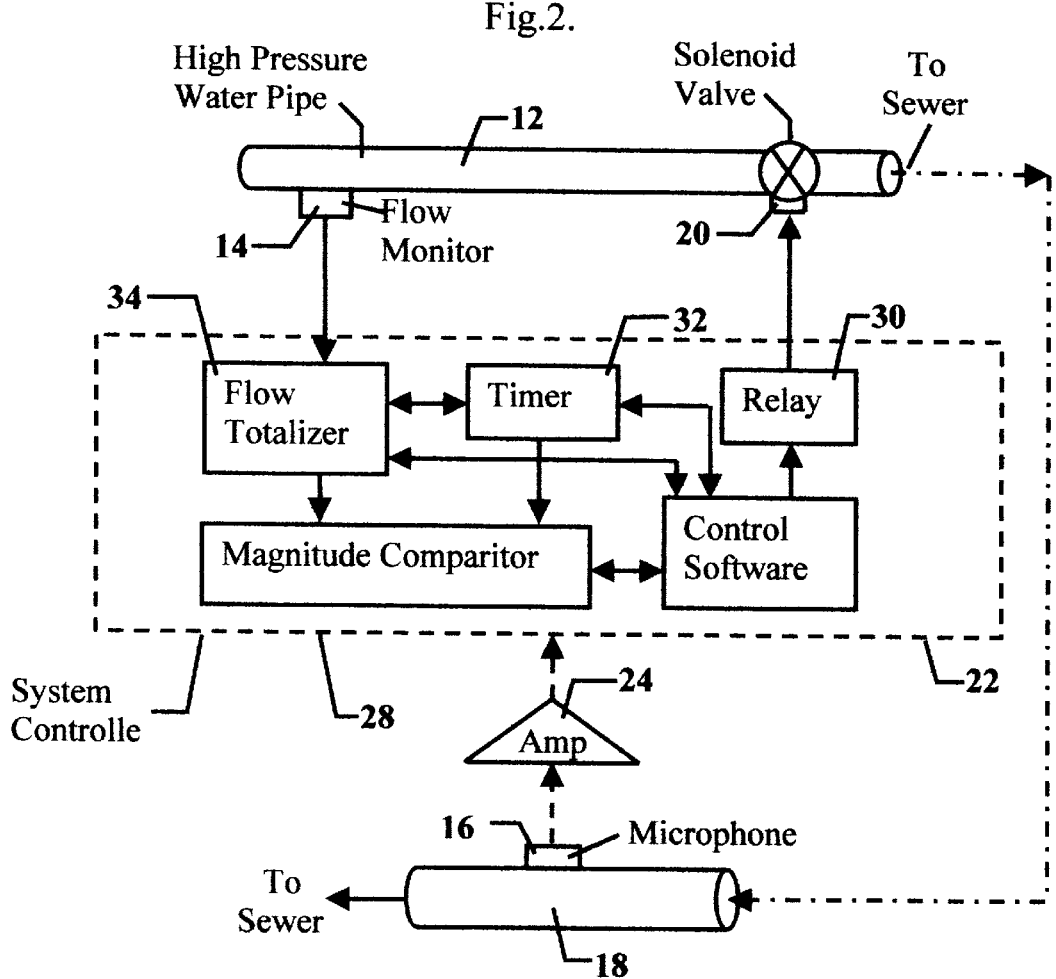
FIG. 2 is a schematic view of a modified water flow monitoring system in accordance with this invention.

In the preferred practice of this invention, as shown in FIG. 2, the pressurized water flow monitor 14 sends a signal to a controller 22 which uses a timer 32 which times the period of continuous water flow, and/or uses a flow totalizer 34 which monitors the accumulated volume of water flow. The controller preferably uses a magnitude comparitor 28 to compare the period of time of continual water flow with a predetermined or preselected period of time considered as a set-point, and/or compares the accumulated volume of water which has flowed during the same time period with a predetermined or preselected accumulated volume of water considered as a set-point. The preselected period of time would correspond to the period of time that intentional uninterrupted flow would occur with some safety factor time period added, and/or the preselected accumulated volume threshold of water would correspond to the volume of water that would accumulate during intentional uninterrupted flow with some safety factor accumulated volume added. When the actual period of time indicative of continual water flow reaches the predetermined period of time, and/or when the actual accumulated volume of water indicative of continual water flow reaches the predetermined accumulated volume of water, the controller determines that there is a leak or some abnormal water flow condition. Controller 22 then actuates the action taking means, to respond to the determination of the leak by interrupting water flow or otherwise taking some action as indicated above. Where, for example, a valve 20 is used as the action taking means, the valve 20 remains closed regardless of future input signals from the flow monitor. In order to resume water flow through pipe 12 it is necessary for a manual resetting of the controller 22 and/or valve 20. This manual resetting assures that someone is aware that a leak or abnormal flow condition has been detected and that the water flow is not resumed until the person determines that it is safe to resume such water flow. As noted, the preselected period of time, and/or the preselected accumulated volume of water, would take into account the longest expected continuous water flow, such as, for example, the amount of flow necessary to fill a bathtub or to operate a washing machine.

The invention takes into account the situation involving continual water flow for a period, and/or accumulated volume, such as a long shower wherein no leak has occurred. In this situation the second flow monitor, such as microphone 16 or other type of flow detection device would be used to monitor the sewer or drain flow. Where monitor 16 is used if the flow of water is detected through the sewer pipe 18 in addition to the upstream portion 12, the signal from monitor 16 would override the signal from monitor 14 and prevent the actuation of valve 20 so that the flow is allowed to continue through the plumbing system. Thus, if the flow of water detected by monitor 14 is also reached at the downstream sewer 18 as detected by monitor 16 then there is no leak and the prolonged water flow is an intended water flow. Where, however, flow is detected through pipe 12 by monitor 14 for a period of time, and/or for an accumulated volume, exceeding the preset period of time, and/or the accumulated volume respectively, and a corresponding flow is not detected by monitor 16 then it is concluded that there must be a leak and valve 20 is actuated.

The controller may be configured such that two different allowable time periods for continuous flow are included. The first allowable time period (T1) for continuous flow is used by the controller means as a set-point for comparison to the actual continuous flow time period in the case where no is detected in the downstream sewer line. The second allowable time period (T2) for continuous flow is used by the control means as a set point for the comparison to the actual continuous flow time period in the case where flow is detected in the downstream sewer line. The second time period set point (T2) will be equal to or longer than the first continuous time period set point (T1).

In addition, the controller may be configured such that two different allowable accumulated volume levels during continuous flow are included. The first allowable accumulated volume level during continuous flow (V1) is used by the control means as a set point for comparison to the actual accumulated volume during continuous flow in the case where no flow is detected in the downstream sewer line. The second allowable accumulated volume level during continuous flow (V2) is used by the control means as a set point for comparison to the actual accumulated volume during continuous flow in the case where flow is detected in the downstream sewer line. The second accumulated volume level set point (V2) will be equal to or longer than the first continuous accumulated volume level set point (V1).

The elapsed time of continuous flow and the accumulated volume during continuous flow may be simultaneously monitored by the control means. The control means will actuate the water shut-off device when either the elapsed-time period or the accumulated volume level equal to the respective set point indicative of a leak is reached.

Figure 3:
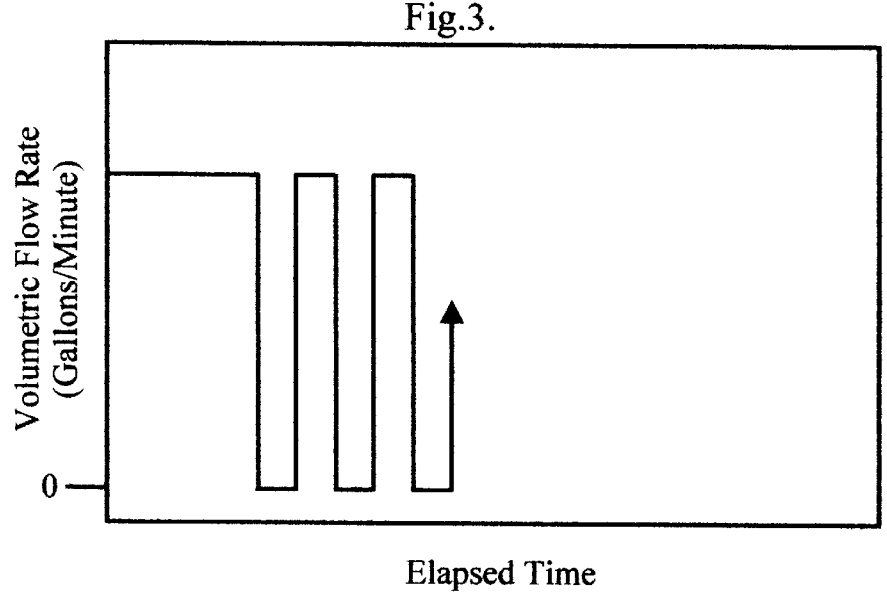
FIG. 3 is a graph of pulsatile, water flow during the alarm period caused by the controller to warn the water user that a set-point has been exceeded.

Controller 22 and flow actuator 20 may be configured to alert the water user with one or more off-on, water-pulses transmitted through the water system, as shown in FIG. 3, to warn that water flow will soon cease as a result of reaching a time and/or accumulated volume limit. The pulsating, water-warning signals the water user to momentarily slow or stop water use in response to the warning. A successful response results in a rezeroing of the time and accumulated volume measurands being monitored by controller 22, thus restoring and prolonging water use. Failure to respond to the warning results in a halting of water flow.

Figure 4:
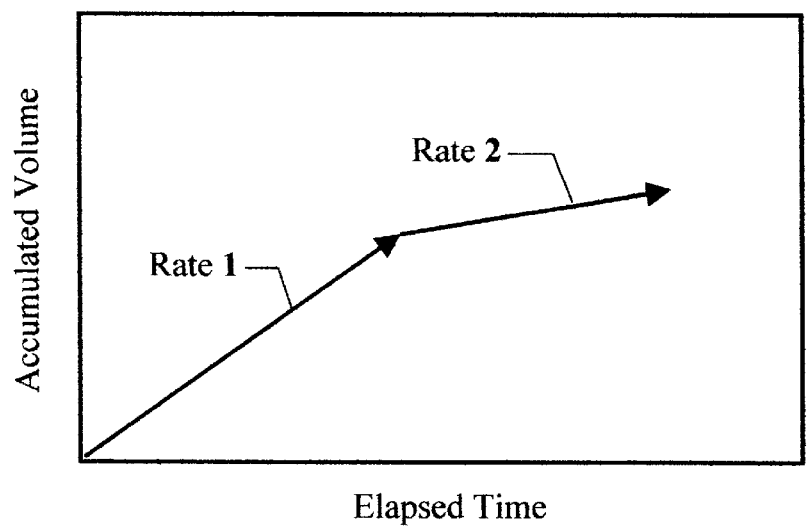
FIG. 4 is a graph of decreasing flow rate indicative of a properly function plumbing system.

In addition, controller 22 may be configured to rezero the time and accumulated volume measurands upon detecting a slow and sufficient decrease in established flow rate as illustrated in FIG. 4. Water volumetric flow rate, i.e. volume of flow per time, may vary during normal continuous use.

This situation may occur when a high volumetric flow rate, for example Rate 1 in FIG. 4, is established due to, for example, two concurrent uses of water, followed by one of the users stopping that one portion of flow. Flow continues through the remaining part of the system, however, at a decreased rate, for example Rate 2 in FIG. 4. The controller senses said decrease, responds by rezeroing the time and accumulated volume measurands, and monitoring continues.

The invention may also be practiced to account for situations where uninterrupted water flow is intended to continue for long periods of time without reaching the sewer pipe. Such situations, for example, might be outdoor use, such as watering a lawn or the filling of a pool. In such situations, the invention would be practiced by placing the flow monitoring device downstream in the water circuit where such outdoor flow would not be detected.

Figure 5:
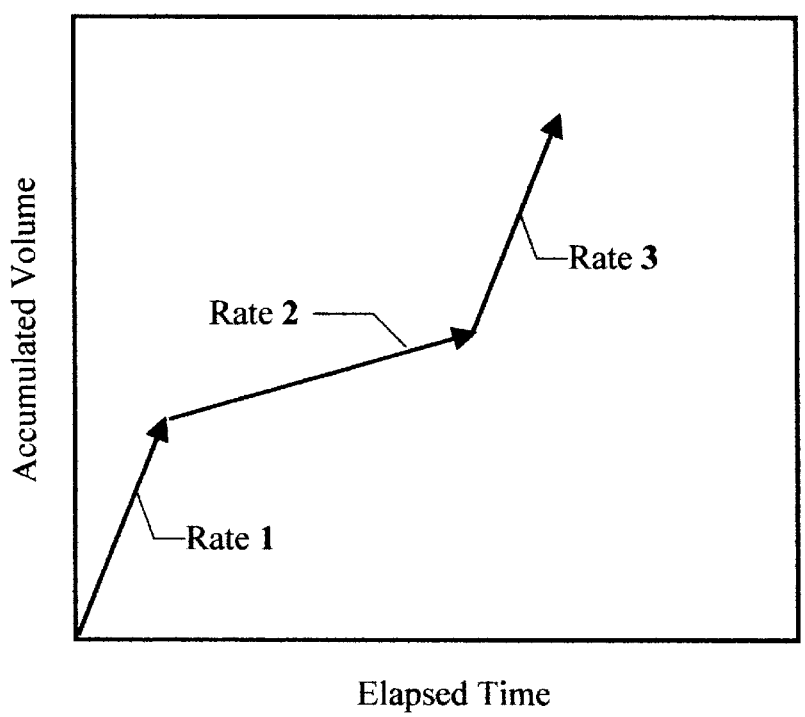
FIG. 5 is a graph of a rapid, large decrease in flow rate indicative of intentional, temporary deactivation of the system controller by the user of water.

Alternatively, controller 22 may be configured to allow temporary deactivation of said control in response to receiving a signal transmitted by the water user, remotely from the point of use, communicated via the pressurized flow. When, for example, the sequence of a high flow rate 1, followed by a low flow rate 2, followed by a high flow rate 3, as illustrated FIG. 5, is detected by the controller, said controller determines that the water user has transmitted the signal through the pressurized plumbing system to temporarily deactivate the control function The duration of the deactivated control period would continue for the duration of continuous water flow. Active control would automatically be restored once the water flow ended. Another example of signals transmitted via the pressurized flow by the water user, remotely from the point of use, is one, or more, rapid pulses of water flow each created by rapidly opening then closing then immediately reopening a water faucet, or by first widely opening then partially closing a water faucet to establish a rapid reduction in water flow rate sensed by controller 22. Such rapid reduction in water flow rate would indicate the intentional, temporary deactivation of control for the remainder of the subsequent continuous water use period.

An alternate control version is to provide a means of overriding the control device, remotely at the point of water use, only for the duration of intended water use (e.g. with a switch at the outdoor valve.).

Controller 22 may be configured to learn the water-usage routine of the water system being controlled to base the magnitudes of time and accumulated volume limits on the water-usage routine. Said controller may be configured to observe, for a period of time, the water-usage routine of the water system being controlled. The observation time period should be of sufficient duration for the full range of water-usage to occur. During said observation time period, the limits T1, T2, V1, and V2 may be adjusted to appropriately conform to the water-usage routine, after which water flow monitoring and control may be initiated.

If desired the invention may be practiced by including in the controller a time-of-day, day-of-week clock to enable changing set points to better match the homeowner's schedule.

Any suitable known techniques could be used for measuring the volume of flow, such as techniques used in gasoline pumps at service stations or techniques used for metering volumes of oil for home oil heating use. Other examples are techniques disclosed in U.S. Pat. Nos. 4,881, 948 and 5,086,806. As previously described the invention is not intended to be limited to the monitoring of water through the plumbing system of a structure but could be practiced in other manners such as the monitoring of other types of fluid through the pipe and determining leakage. Additionally, it is to be understood that the invention may be practiced for monitoring, for example, water leakage from a pressurized water system due to an opening or leak resulting from water freezing in a pipe. There is a need to have such an automatically acting water shut-off mechanism or alarm in such a pressurized water system in the event that water escapes from a split or open pipe as a result of a temperature drop during a freezing period followed by an increase in temperature.

The automatically acting water system of this invention is also beneficial in its ability to conserve water relative to situations where no such monitoring or control means exist. System 10 would be useful where there are poorly functioning toilet flush arrangements which cause a continual flow of fresh water to occur thereby resulting in the waste of water resources and the increase in water and sewer bills in addition to posing a danger to the building and its contents in the event of toilet overflow in an uncontrolled manner. With system 10, such damage and cost would be greatly reduced and minimized relative to an uncontrolled or unmonitored system without use of the present invention.

To determine if a leak has occurred the leak monitoring system may be used to monitor either, or both, of the following parameters:

1. The period of time (e.g minutes) of continual water flow, and/or;

2. The accumulated volume (e.g. gallons) during continual water flow. Either, or both of these measured values (measurands) are continually compared to predetermined set points which have been programmed into the monitoring system controller.

In the event that either of the measurands equal or exceed the predetermined set points (i.e. time of continual flow and/or accumulated volume of water during continual flow) the controller will activate a shut-off valve to warn the water user with a series of off-on pulses through the water system, and/or to halt water flow.

In the event that a given episode of water flow ends prior to reaching the predetermined time set-point and/or ends prior to reaching the predetermined accumulated volume level, the timer and/or the volume meter will automatically reset to zero time and/or zero volume respectively in preparation to monitor the next period of continual water flow.

EXAMPLE 1

The following components were used in combination with a residential plumbing system.

1. A paddle-wheel type flow sensor 14, model #155421, manufactured by the Gem Sensor Co., Inc., placed in series with the pressurized plumbing system 12 near the location where said plumbing system entered the building. The flow sensor 14 transmitted a pulsed output at a frequency proportional to the volumetric flow rate through the pressurized plumbing, to controller 22 of FIG. 1.

2. A normally-open, electrically actuated solenoid valve 20 model #8210G35, manufactured by the Automatic Switch Company, placed in series with the pressurized plumbing system near the location where said plumbing system entered the building. The solenoid valve 20 was used to stop water flow in response to receiving a signal from the flow controller 22 in FIG. 1.

3. An electric condenser microphone 16 and preamplifier 24 circuit used to sense sound due to flow in the sewer system of the building, placed on the sewer pipe 18 at the location where the sewer pipe exited said building. Upon sensing sound due to flow in the sewer, the preamplifier 24 transmitted a positive voltage to controller 22 in FIG. 1. When sensing no sound due to the absence of flow in the sewer, the preamplifier 24 transmitted zero voltage to controller 22.

4. A single-board computer, programmable controller 22, model AES-10 manufactured by the AES Controller Corporation, Santa Anna, Calif., was used to receive input signals from the pressurized plumbing flow sensor and the sewer-line flow sensor, and to control the solenoid valve. The controller contained a pushbutton keypad used to enter information and a liquid crystal display used to observe the entry of said information and to display time and accumulated volume of flow values.

The controller was programmed with software which enabled it to monitor the elapsed time period of continuous flow and the accumulated volume of liquid during continuous flow through the pressurized plumbing system. The controller also monitored the presence or absence of flow through the sewer pipe.

The controller was programmed with two allowable time periods for continuous flow. The first allowable time period (T1) for continuous flow was used by the controller means as a set-point for comparison to the actual continuous flow time period in the case where no flow was detected in the downstream sewer line. The second allowable time period (T2) for continuous flow was used by the control means as a set point for the comparison to the actual continuous flow time period in the case where flow was detected in the downstream sewer line. T1 was set to 20 minutes and T2 was set to 60 minutes.

In addition, the controller was programmed with two allowable accumulated volume levels during continuous flow. The first allowable accumulated volume level (V1) was used by the controller as a set point for comparison to the actual accumulated volume during continuous flow in the case where no flow was detected in the downstream sewer line. The second allowable accumulated volume level during continuous flow (V2) was used by the control means as a set point for comparison to the actual accumulated volume during continuous flow in the case where flow was detected in the downstream sewer line. V1 was set to 20 gallons and V2 was set to 99 gallons.

Figure 6:
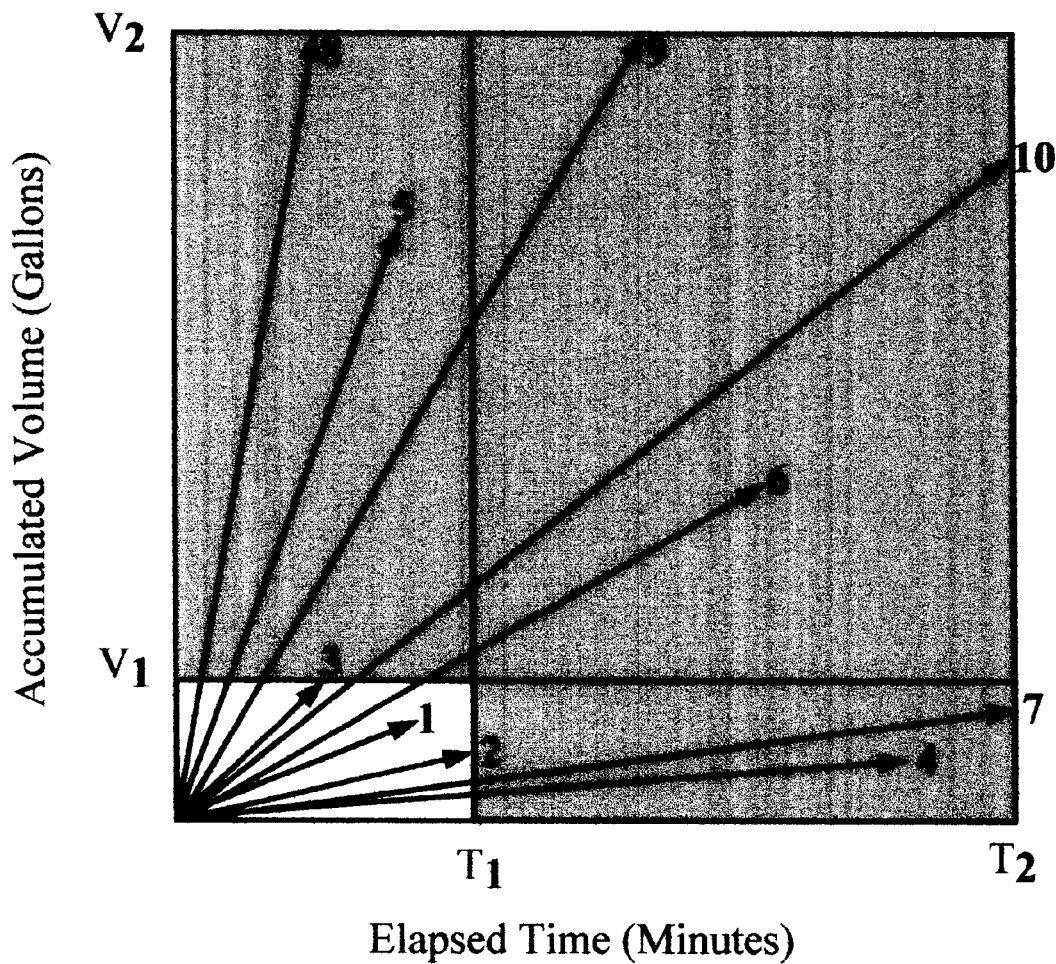
FIG. 6 is a graph of prospective water use histories of various times and flow rates.

Examples of system operation are illustrated in FIG. 6. FIG. 6 shows water use histories of various times and flow rates. Lines which penetrate into the shaded region indicate water use situation when the sewer monitor detects flow and therefore the controller allowed prolonged water use time or prolonged allowable accumulated volume.

The following conditions are illustrated by the individual lines of FIG. 6.

Line 1. Period of water use ended before first time or volume set point was reached Result: Timer and volume meter reset to zero in preparation for next water usage.

Line 2. Period of water use reached first time set point and controller sensed no flow in sewer line. Result: Valve was actuated and water flow ceased.

Line 3. Period of water use reached first volume set point and controller sensed no flow in sewer line. Result: Valve was actuated and water flow ceased.

Line 4. Period of water use allowed to pass first time set point as controller sensed flow in sewer. Period of water use ended before reaching second time set point. Result: Timer and volume meter reset to zero in preparation for next water usage.

Line 5. Period of water use allowed to pass first volume set point as controller sensed flow in sewer Period of water use ended before reaching second volume set point. Result: Timer and volume meter reset to zero in preparation for next water usage.

Line 6. Period of water use allowed to pass first volume and time set points as controller sensed flow in sewer. Period of water use ended before reaching second time or volume set point. Result: Timer and volume meter reset to zero in preparation for next water usage.

Line 7. Period of water use allowed to pass first time set point as controller sensed flow in sewer. Period of water use continued and reached second time set point. Result: Valve was actuated and water flow ceased.

Line 8. Period of water use allowed to pass first volume set point as controller sensed flow in sewer. Period of water use continued and reached second volume set point. Result: Valve was actuated and water flow ceased.

Line 9. Period of water use allowed to pass first time and volume set points as controller sensed flow in sewer. Period of water use continued and reached second volume set point Result: Valve was actuated and water flow ceased.

Line 10. Period of water use allowed to pass first time and volume set points as controller sensed flow in sewer. Period of water use continued and reached second time set point. Result: Valve was actuated and water flow ceased.

EXAMPLE 2

The hardware system used was described in Example 1. The controller 22 was programmed with software which frequently and continuously determined the current volumetric flow rate, which was calculated by dividing the volume of flow pumped during a given period of time by said period of time. The controller stored the values of volumetric flow rates and continuously compared the current volumetric flow rate to previous volumetric flow rates which occurred earlier during the same continuous water usage When a sufficient reduction occurred in volumetric flow rate, as shown in FIG. 4, the controller determined that a the plumbing system was properly operating and the time and accumulated volume measurands were reset to zero. Uninterrupted monitoring and control continued.

EXAMPLE 3

The hardware system used was described in Example 1. The controller 22 was programmed with software which frequently and continuously determined the current volumetric flow rate, which was calculated by dividing the volume of flow pumped during a given period of time by said period of time. The controller stored the values of volumetric flow rates and continuously compared the current volumetric flow rate to previous volumetric flow rates which occurred earlier during the same continuous water usage.

The water user was able to temporarily disable the controller function from a location in the building remote from said controller. The water user temporarily disabled the controller by first opening, then closing, then immediately reopening a water faucet. By transmitting through the plumbing system, the high-flow rate 1, low-flow rate 2, high-flow rate 3 signal to the controller, as shown in FIG. 5, the water user signaled to said controller the intent to temporarily disable controller function for the extent of the present use period. When the user stopped continuous flow, the control function was restored.

EXAMPLE 4

The hardware system used was described in Example 1. Controller 22 monitored time and accumulated volume of flow and compared these measurands to time and accumulated volume set-point limits. Controller 22 was configured to warn the water user that water flow will soon cease as a result of reaching a time and/or accumulated volume limit with a series of off-on water pulses caused by the toggling of the actuator, solenoid valve 20. The toggling of said actuator valve caused a temporary flow interruption observed by the water user at the location of water use, as shown in FIG. 3.

When the water user responded by momentarily slowing or stopping flow, the controller sensed the change in flow rate, reset he timer and accumulated volume flow measurands to zero and normal flow resumed. Failure by the water user to respond during the pulsatile-flow, warning-alarm period resulted in a permanent halting of the water flow by controller 22.

EXAMPLE 5

The hardware system used was described in Example 1. Controller 22 monitored time and accumulated volume of flow and compared these measurands to time and accumulated volume set-point limits. Controller 22 was configured to monitor the water-usage routine of the water system being controlled for a period of time. Said period of time was designated to be sufficient for the full range of water-usage to occur. During said period of time the limits T1, T2, V1, and V2 were adjusted to appropriately conform to said water-usage routine. Upon completion of said time period, said limits T1, T2, V1, and V2 were set and monitoring and control were initiated.

EXAMPLE 6

The hardware system used was described in Example 1. Controller 22 monitored time and accumulated volume of flow and compared these measurands to time and accumulated volume set-point limits. Controller 22 was configured to warn the water user that water flow will soon cease as a result of reaching a time and/or accumulated volume limit with a series of off-on water pulses caused by the toggling of the actuator, solenoid valve 20. The toggling of said actuator valve caused a temporary flow interruption observed by the water user at the location of water use, as shown in FIG. 3.

When the water user responded by momentarily slowing or stopping flow, the controller sensed the change in flow rate, reset the timer and accumulated volume flow measurands to zero and normal flow resumed.

In addition, due to the water user's response controller 22 conformed to said user's routine and increased the time or accumulated volume set-point by 5 minutes or 5 gallons respectively depending upon the which original set-point, i.e. time or accumulated volume, was reached.

What is claimed is:

1. In a fluid flow monitoring system for determining the presence of leaks in plumbing pipes of a plumbing pipe system having fluid flowing therethrough under high pressure, the system comprising a flow monitoring device mounted to a pipe of the plumbing pipe system for sensing the flow of fluid through the pipe, control means to monitor time, flow rate, and accumulated volume measurands received from said flow monitor, said control means comparing current flow rate to prior flow rates during water usage and resetting to zero the time and accumulated volume measurands during continuous flow upon detecting sufficient decrease in flow rate, and action taking means actuated by said control means when continuous said flow exceeds measurand limits.

2. The system of claim 1 wherein said decrease in flow rate is greater than or equal to 0.5 gallons per minute.

3. The system of claim 1 wherein said decrease in flow rate is greater than or equal to 1.0 gallons per minute.

4. The system of claim 1 wherein said decrease in flow rate is greater than or equal to 2.0 gallons per minute.

5. The system of claim 1 wherein said control means actuates said action taking means when the period of time of continuous flow sensed by said monitor device also exceeds a predetermined period of time.

6. The system of claim 1 wherein said control means actuates said action taking means when the accumulated volume of flow sensed by said monitor device also exceeds a predetermined accumulated volume of flow.

7. The system of claim 1 wherein control is temporarily suspended during present water-use period in response to said control means receiving a signal transmitted by the water user through the pressurized water system and received by said control means.

8. The system of claim 7 wherein control is temporarily suspended in response to said control means receiving a high water flow, low water flow, high water flow signal transmitted by the water user through the pressurized water system and received by said control means.

9. The system of claim 7 wherein said signal is a number of on-off water flow pulses greater than or equal to one.

10. The system of claim 7 wherein control is automatically restored immediately after said water-use period ends.

11. The system of claim 7 wherein said control means warns the water user with a series of off-on water pulses to alert that water flow will soon cease as a result of reaching a time and/or accumulated volume limit.

12. The system of claim 11 wherein said warning is one or more off-on water pulses communicated through said water system caused by said controller toggling said action taking means.

13. The system of claim 11 wherein response to said warning results in restoring water flow.

14. The system of claim 11 wherein response to said warning is a momentary decrease of water flow by the water user.

15. The system of claim 11 wherein response to said warning results in rezeroing of the time and accumulated volume measurands.

16. The system of claim 11 wherein response to said warning results in an increase of preselected period of time.

17. The system of claim 11 wherein response to said warning results in an increase of preselected period of time of greater than or equal to one minute.

18. The system of claim 11 wherein response to said warning results in an increase of preselected accumulated volume.

19. The system of claim 11 wherein response to said warning results in an increase of preselected accumulated volume of greater than or equal to one gallon.

20. The system of claim 11 wherein failure to respond to said warning results in activation of said action taking means.

* * * * *